US005128227A

United States Patent [19]

Monbaliu et al.

[11] Patent Number: 5,128,227

[45] Date of Patent: Jul. 7, 1992

[54] ELECTROPHOTOGRAPHIC RECORDING MATERIAL HAVING A JULOLIDINE HYDRAZONE COMPOUND

[75] Inventors: Marcel J. Monbaliu, Mortsel; David R. Terrell, Lint; Stefaan K. De Meutter, Zandhoven, Belgium; Paul R. Callant, Edegem, all of Belgium

[73] Assignee: Agfa-Gevaert, N.V., Mortsel, Belgium

[21] Appl. No.: 674,177

[22] Filed: Mar. 25, 1991

[30] Foreign Application Priority Data

Mar. 27, 1990 [EP] European Pat. Off. ........ 90200717.8

[51] Int. Cl.[5] ............................................ G03G 5/047

[52] U.S. Cl. ....................................... 430/59; 430/74; 430/75; 430/76; 430/78; 430/83

[58] Field of Search ....................... 430/59, 78, 74, 75, 430/76, 83

[56] References Cited

U.S. PATENT DOCUMENTS 3,615,533 10/1971 Rauner et al. .......................... 96/67

4,599,287 7/1986 Fujimaki et al. ...................... 430/59

4,786,571 11/1988 Ueda .................................... 430/59

FOREIGN PATENT DOCUMENTS 60-140744 7/1985 Japan .

*Primary Examiner*—Marion E. McCamish

*Assistant Examiner*—Rosemary Ashton

*Attorney, Agent, or Firm*—Breiner & Breiner

[57] ABSTRACT

An electrophotographic recording material which comprises an electrically conductive support having thereon a photoconductive layer containing one or more p-type photoconductive charge transport substances, characterized in that at least one of the p-type charge transport substances is a hydrazone compound corresponding to a general formula (I) to (V) as defined in the description, and the use of a said hydrazone compound in the charge transporting layer of a bilayer-system photoconductive material comprising a charge generating layer in contiguous relationship with said charge transporting layer.

13 Claims, No Drawings

ELECTROPHOTOGRAPHIC RECORDING MATERIAL HAVING A JULOLIDINE HYDRAZONE COMPOUND

DESCRIPTION

1. Field of the Invention

The present invention relates to a photosensitive recording material suited for use in electrophotography.

2. Background of the Invention

In electrophotography photoconductive materials are used to form a latent electrostatic charge image that is developable with finely divided colouring material, called toner.

The developed image can then be permanently affixed to the photoconductive recording material, e.g. photoconductive zinc oxide-binder layer, or transferred from the photoconductor layer, e.g. selenium layer, onto a receptor material, e.g. plain paper and fixed thereon. In electrophotographic copying and printing systems with toner transfer to a receptor material the photoconductive recording material is reusable. In order to permit a rapid multiple printing or copying a photoconductor layer has to be used that rapidly looses its charge on photo-exposure and also rapidly regains its insulating state after the exposure to receive again a sufficiently high electrostatic charge for a next image formation. The failure of a material to return completely to its relatively insulating state prior to succeeding charging/imaging steps is commonly known in the art as "fatigue".

The fatigue phenomenon has been used as a guide in the selection of commercially useful photoconductive materials, since the fatigue of the photoconductive layer limits the copying rates achievable.

Another important property which determines whether or not a particular photoconductive material is suited for electrophotographic copying is its photosensitivity that must be high enough for use in copying apparatus operating with a copying light source of fairly low intensity.

Commercial usefulness further requires that the photoconductive layer has a chromatic sensitivity that matches the wavelength(s) of the light of the light source, e.g. laser or has panchromatic sensitivity when white light is used e.g. to allow the reproduction of all colours in balance.

Intensive efforts have been made to satisfy said requirements, e.g. the spectral sensitivity of selenium has been extended to the longer wavelengths of the visible spectrum by making alloys of selenium, tellurium and arsenic. In fact selenium-based photoconductors remained for a long time the only really useful photoconductors although many organic photoconductors were discovered.

Organic photoconductor layers of which poly(N-vinylcarbazole) layers have been the most useful were less interesting because of lack of speed, insufficient spectral sensitivity and rather large fatigue.

However, the discovery that 2,4,7-trinitro-9-fluorenone (TNF) in poly(N-vinylcarbazole) (PVCz) formed a charge-transfer complex strongly improving the photosensitivity (ref. U.S. Pat. No. 3,484,237) has opened the way for the use of organic photoconductors in copying machines that could compete with the selenium-based machines.

TNF acts as an electron acceptor whereas PVCz serves as electron donor. Films consisting of said charge transfer complex with TNF:PVCz in 1:1 molar ratio are dark brown, nearly black and exhibit high charge acceptance and low dark decay rates. Overall photosensitivity is comparable to that of amorphous selenium (ref. Schaffert, R. M. IBM J. Res. Develop., 15, 75 (1971).

A further search led to the discovery of phthalocyanine-binder layers, using poly(N-vinylcarbazole) as the binder [ref. Hackett, C. F., J. Chem. Phys., 55, 3178 (1971)]. The phthalocyanine was used in the metal-free X form and according to one embodiment applied in a multilayer structure wherein a thin layer of said phthalocyanine was overcoated with a PVCz layer. Hackett found that photoconductivity was due to field dependent photogeneration of electron-hole pairs in the phthalocyanine and hole injection into the PVCz. The transport of the positive charges, i.e. positive hole conduction proceeded easily in the PVCz layer. From that time on much research has been devoted to developing improved photoconductive systems wherein charge generation and charge transport materials are separate in two contiguous layers (see e.g. U.K. Pat. No. 1,577,859). The charge generating layer may be applied underneath or on top of the charge transport layer. For practical reasons, such as less sensitivity to wear and ease of manufacture, the first mentioned arrangement is preferred wherein the charge generating layer is sandwiched between a conductive support and a light transparent charge transport layer (ref. Wolfgang Wiedemann, Organische Photoleiter—Ein Uberblick, II, Chemiker Zeitung, 106. (1982) Nr. 9 p. 315).

In order to form a photoconductive two layer-system with high photosensitivity to the visible light dyes having the property of photo-induced charge generation have been selected. Preference is given to a water-insoluble pigment dye of e.g. one of the following classes:

a) perylimides, e.g. C.I. 71 130 (C.I.=Colour Index) described in DBP 2 237 539,
b) polynuclear quinones, e.g. anthanthrones such as C.I. 59 300 described in DBP 2 237 678,
c) quinacridones, e.g. C.I. 46 500 described in DBP 2 237 679,
d) naphthalene 1,4,5,8-tetracarboxylic acid derived pigments including the perinones, e.g. Orange GR, C.I. 71 105 described in DBP 2 239 923,
e) phthalocyanines and naphthalocyanines, e.g. $H_2$-phthalocyanine in X-crystal form (X-$H_2$Pc), metal phthalocyanines, e.g. CuPc C.I. 74 160 described in DBP 2 239 924, indium phthalocyanine described in U.S. Pat. No. 4,713,312, and silicon naphthalocyanines having siloxy groups bonded to the central silicon as described in EP-A 0 243 205.
f) indigo- and thioindigo dyes, e.g. Pigment Red 88, C.I. 73 312 described in DBP 2 237 680,
g) benzothioxanthene-derivatives as described e.g. in DAS 2 355 075,
h) perylene 3,4,9,10-tetracarboxylic acid derived pigments including condensation products with o-diamines as described e.g. in DAS 2 314 051,
i) polyazo-pigments including bisazo-, trisazo- and tetrakisazo-pigments, e.g. Chlordiane Blue C.I. 21 180 described in DAS 2 635 887, and bisazopigments described in DOS 2 919 791, DOS 3 026 653 and DOS 3 032 117,
j) squarilium dyes as described e.g. in DAS 2 401 220,
k) polymethine dyes.

l) dyes containing quinazoline groups, e.g. as described in GB-P 1 416 602 according to the following general formula:

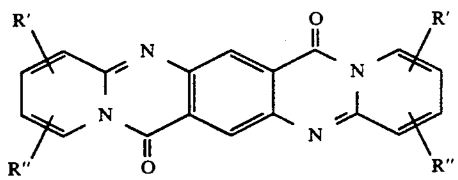

in which R' and R'' are either identical or different and denote hydrogen, $C_1$–$C_4$ alkyl, alkoxy, halogen, nitro or hydroxyl or together denote a fused aromatic ring system, m) triarylmethane dyes, and n) dyes containing 1,5 diamino-anthraquinone groups.

The charge transporting layer can comprise either a polymeric material or a nonpolymeric material. In the case of nonpolymeric materials the use of such materials with a polymeric binder is generally preferred or required for sufficient mechanical firmness and flexibility. This binder may be "electronically inert" (that is incapable of substantial transport of at least one species of charge carrier) or can be "electronically active" (capable of transport of that species of charge carriers that are neutralized by a uniformly applied electrostatic charge). For example, in the arrangement: conductive support-charge generating layer-charge transport layer, the polarity of electrostatic charging that gives the highest photosensitivity to the arrangement has to be such that negative charging is applied to a hole conducting (p-type) charge transport layer and positive charging is applied to an electron conducting (n-type) charge transport layer.

Since most of the organic pigment dyes of the charge generating layer provide more efficient hole injection than electron injection across a field-lowered barrier at the interface where pigment-dye/charge transport compounds touch each other and possibly form a charge transfer complex there is a need for charge transport materials that have a good positive hole transport capacity for providing an electrophotographic recording system with low fatigue and high photosensitivity.

According to the already mentioned article "Organische Photoleiter—Ein Uberblick; II of Wolfgang Wiedemann, p. 321, particularly efficient p-type transport compounds can be found in the group consisting of heteroaromatic compounds, hydrazone compounds and triphenylmethane derivatives. Examples of double layer systems containing hydrazone compounds as charge transporting substance are described e.g. in published EP-A 0 295 792, U.S. Pat. Nos. 4,150,987, 4,278,747 and 4,365,014, and in Japanese laid-open patent application (Kokai) No. 60-130744, wherein a julolidine-hydrazone compound is described.

SUMMARY OF THE INVENTION

It is an object of the present invention to provide a photoconductive material with high chargeability and high photosensitivity due to its containing of a hydrazone compound with particularly high p-type charge transport capacity and good chargeability in a binder layer.

It is a particular object of the present invention to provide a photoconductive composite layer material comprising a charge generating layer in contiguous relationship with a charge transport layer containing a hydrazone compound that has a particularly high p-type charge transport capacity, yields resin layers with good chargeability wherein it is compatible with insulating resin binders to form an optically clear charge transporting layer. Such photosensitive layers exhibit very high photosensitivity and satisfactory contrast potentials.

It is another object of the present invention to provide a recording process wherein a charge pattern of negative charge polarity is formed on said composite layer material by negatively charging the charge transport layer containing a photoconductive hydrazone compound and imagewise photo-exposing the charge generating layer that is in contiguous relationship with said charge transport layer.

It is a further object of the present invention to provide electrophotographic recording materials with high photosensitivity which after being charged obtain a very sharp decrease in voltage [$\Delta V$] within a particular narrow range [$\Delta E$] of photo-exposure doses, viz. wherein the photo-exposure doses required for 10% and 90% discharge differ by a factor of 4.5 or less.

Other objects and advantages of the present invention will appear from the further description and examples.

According to the present invention an electrophotographic recording material is provided which comprises an electrically conductive support having thereon a photoconductive layer containing one or more p-type photoconductive charge transport substances, characterized in that at least one of the p-type charge transport substances is a hydrazone compound corresponding to a following general formula (I) to (V):

(I)

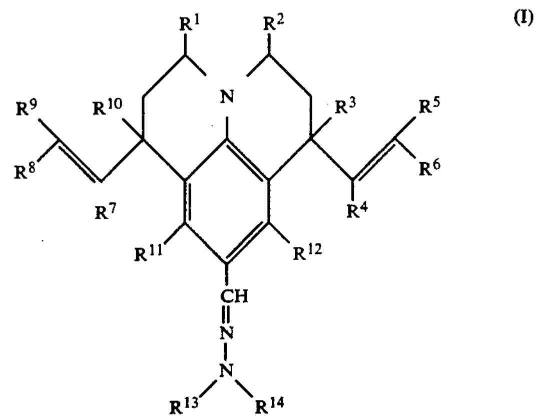

wherein:

each of $R^1$ and $R^2$ represents hydrogen, or $R^1$ represents hydrogen and $R^2$ represents an alkyl, an aryl or a heterocyclic group, each of $R^3$, $R^4$, $R^5$, $R^6$, $R^7$, $R^8$, $R^9$ and $R^{10}$ (same or different) represents hydrogen or an alkyl group, each of $R^{11}$ and $R^{12}$ (same or different) represents hydrogen, an alkyl group, an alkoxy group, thioalkoxy group, N-dialkyl group or halogen, each of $R^{13}$ and $R^{14}$ (same or different) represents an alkyl group, an aryl group or a heterocyclic group, or $R^{13}$ and $R^{14}$ together represent the necessary atoms to close a heterocyclic nitrogen containing ring;

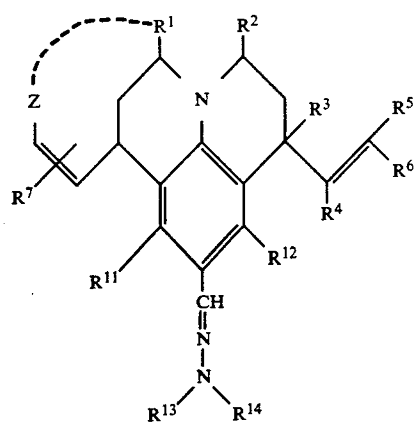

wherein:

each of $R^1$ and $R^2$ is hydrogen, or one of $R^1$ and $R^2$ represents hydrogen and the other represents an alkyl, an aryl or a heterocyclic group, Z represents the necessary atoms to close a 5- or 6-membered homocyclic ring, each of $R^3$, $R^4$, $R^5$, $R^6$ and $R^7$ (same or different) represents hydrogen or an alkyl group, each of $R^{11}$ and $R^{12}$ (same or different) represents hydrogen, an alkyl group, an alkoxy group, thioalkoxy group, N-dialkyl group or halogen, and each of $R^{13}$ and $R^{14}$ (same or different) represents an alkyl group, an aryl group or a heterocyclic group, or $R^{13}$ and $R^{14}$ together represent the necessary atoms to close a heterocyclic nitrogen containing ring;

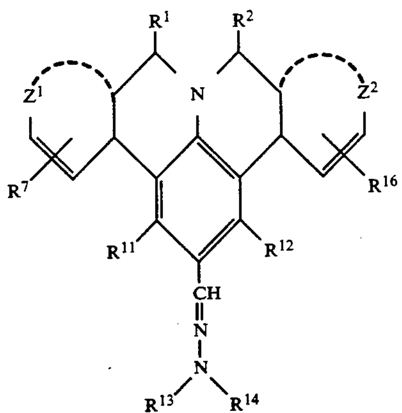

wherein:

each of $R^1$ and $R^2$ represents hydrogen, or $R^1$ represents hydrogen and $R^2$ represents an alkyl, an aryl or a heterocyclic group, each of $Z^1$ and $Z^2$ (same or different) represents the necessary atoms to close a 5- or 6-membered homocyclic ring, each of $R^7$ and $R^{16}$ (same or different) represents hydrogen or an alkyl group, each of $R^{11}$ and $R^{12}$ (same or different) represents hydrogen, an alkyl group, an alkoxy group, thioalkoxy group, N-dialkyl group or halogen, and each of $R^{13}$ and $R^{14}$ (same or different) represents an alkyl group, an aryl group or a heterocyclic group, or $R^{13}$ and $R^{14}$ together represent the necessary atoms to close a heterocyclic nitrogen containing ring;

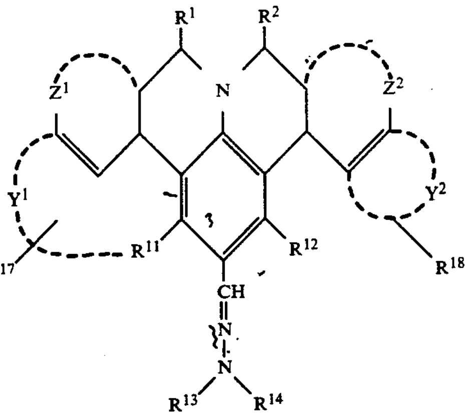

wherein:

each of $R^1$ and $R^2$ represents hydrogen, or $R^1$ represents hydrogen and $R^2$ represents an alkyl, an aryl or a heterocyclic group, each of $Z^1$ and $Z^2$ (same or different) represents the necessary atoms to close a 5- or 6-membered homocyclic ring, each of $Y^1$ and $Y^2$ (same or different) represents the necessary atoms to close a 6-membered aromatic ring, each of $R^{11}$ and $R^{12}$ (same or different) represents hydrogen, an alkyl group, an alkoxy group, thioalkoxy group, N-dialkyl group or halogen, each of $R^{13}$ and $R^{14}$ (same or different) represents an alkyl group, an aryl group or a heterocyclic group, or $R^{13}$ and $R^{14}$ together represent the necessary atoms to close a heterocyclic nitrogen containing ring, and each of $R^{17}$ and $R^{18}$ (same or different) represents hydrogen, an alkyl group, an alkoxy group or halogen;

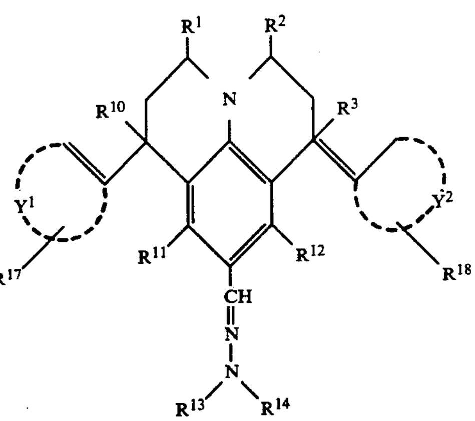

wherein:

each of $R^1$ and $R^2$ represents hydrogen, or $R^1$ represents hydrogen and $R^2$ represents an alkyl, an aryl or a heterocyclic group, each of $Y^1$ and $Y^2$ (same or different) represents the necessary atoms to close a 6-membered aromatic ring, each of $R^3$ and $R^{10}$ (same or different) represents hydrogen or alkyl, each of $R^{11}$ and $R^{12}$ (same or different) represents hydrogen, an alkyl group, an alkoxy group, thioalkoxy group, N-dialkyl group or halogen, each of $R^{13}$ and $R^{14}$ (same or different) represents an alkyl group, an aryl group or a heterocyclic group, or $R^{13}$ and $R^{14}$ together represent the necessary atoms to close a heterocyclic nitrogen containing ring, and each of $R^{17}$ and $R^{18}$ (same or different) represents hydrogen, an alkyl group, an alkoxy group or halogen.

According to one preferred embodiment said electrophotographic recording material comprises an electrically conductive support having thereon a photosensitive charge generating layer in contiguous relationship with a charge transporting layer containing one or more p-type charge transport compounds, characterized in that at least one of the p-type charge transport substances is a hydrazone compound corresponding to a general formula (I) to (V) as defined above.

According to another preferred embodiment said electrophotographic recording material comprises an electrically conductive support having thereon a negatively chargeable photoconductive recording layer which contains in an electrically insulating organic polymeric binder material at least one photoconductive n-type pigment substance and at least one p-type photoconductive charge transport substance, wherein (i) at least one of said p-type charge transport substances is a hydrazone compound corresponding to a general formula (I) to (V) as defined above, (ii) the half wave oxidation potentials of in admixture applied p-type charge transport substances relative to the standard saturated calomel electrode do not differ by more than 0.400 V, (iii) said recording layer has a thickness in the range of 4 to 40 um and comprises 8 to 80% by weight of said n-type pigment substance and 0.01 to 40% of said p-type charge transport substance(s) that is (are) molecularly distributed in said electrically insulating organic polymeric binder material that has a volume resistivity of at least $10^{14}$ Ohm-m, and wherein (iv) said recording layer in electrostatically charged state requires for 10% and 90% discharge respectively exposures to conductivity increasing electromagnetic radiation that differ by a factor 4.5 or less.

When using in a recording material according to the present invention a mixture of p-type charge transport substances including at least one of said hydrazone compounds corresponding to a general formula (I) to (V) as defined above, the hydrazone part represents preferably at least 20% by weight.

The n-type pigment may be inorganic or organic and may have any colour including white. It is a finely divided substance dispersible in the organic polymeric binder of said photoconductive recording layer.

Optionally the support of said photoconductive recording layer is pre-coated with an adhesive and/or a blocking layer (rectifier layer) reducing or preventing positive hole charge injection from the conductive support into the photoconductive recording layer, and optionally the photoconductive recording layer is overcoated with an outermost protective layer, more details about said layers being given furtheron.

In accordance with a preferred mode of said last mentioned embodiment said photoconductive recording layer has a thickness in the range of 5 to 35 μm and contains 10 to 70% by weight of said n-type pigment substance(s) and 1 to 30% by weight of said p-type transport substance(s).

By the term "n-type" material is understood a material having n-type conductance, which means that the photocurrent ($I_n$) generated in said material when in contact with an illuminated transparent electrode having negative electric polarity is larger than the photocurrent ($I_p$) generated when in contact with a positive illuminated electrode ($I_n/I_p>1$).

Preferred examples of n-type pigments dispersible in the binder of a negatively chargeable recording layer of the electrophotographic recording material according to said last mentioned preferred embodiment are organic pigments from one of the following classes:

- perylimides, e.g. C.I. 71 130 (C.I.=Colour Index) described in DPB 2 237 539,
- polynuclear quinones, e.g. anthanthrones such as C.I. 59 300 described in DBP 2 237 678,
- quinacridones, e.g. C.I. 46 500 described in DBP 2 237 679,
- naphthalene 1,4,5,8-tetracarboxylic acid derived pigments including the perinones, e.g. Orange GR, C.I. 71 105 described in DBP 2 239 923,
- n-type indigo and thioindigo dyes, e.g. Pigment Red 88, C.I. 73 312 described in DBP 2 237 680,
- perylene 3,4,9,10-tetracarboxylic acid derived pigments including condensation products with o-diamines as described e.g. in DAS 2 314 051, and
- n-type polyazo-pigments including bisazo-, trisazo- and tetrakisazo-pigments, e.g. N,N'-bis(4-azobenzenyl)perylimide.

DETAILED DESCRIPTION OF THE INVENTION

The melting point of the hydrazones applied according to the invention is preferably at least 100° C. to prevent marked softening of the charge transport layer and diffusion of said compound out of the recording material at elevated temperature conditions.

Preferred compounds for use according to the present invention are listed in Tables A and B hereinafter:

TABLE A

Formula

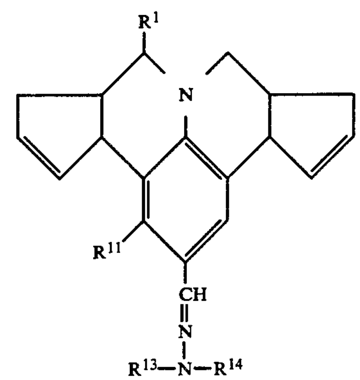

| No. | $R^1$ | $R^{11}$ | $R^{13}$ | $R^{14}$ | Melting point (°C.) |
|---|---|---|---|---|---|
| A.1 | H | H | phenyl | phenyl | 162 |
| A.2 | H | H | $CH_3$ | phenyl | 166 |
| A.3 | H | H | benzyl | phenyl | 186 |
| A.4 | H | H | $CH_3$ | 2-pyridyl | 164 |

TABLE A-continued

Formula

| No. | $R^1$ | $R^{11}$ | $R^{13}$ | $R^{14}$ | Melting point (°C.) |
|---|---|---|---|---|---|
| A.5 | H | H | 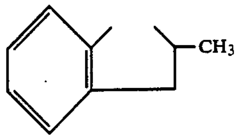 | | 138 |
| A.6 | H | H | 1-naphthyl | phenyl | 194 |
| A.7 | H | $CH_3$ | phenyl | phenyl | 187 |
| A.8 | phenyl | H | phenyl | phenyl | 230 |
| A.9 | phenyl | H | $CH_3$ | phenyl | 179 |

TABLE B

Formula

| No. | $R^1$ | $R^{13}$ | $R^{14}$ | Melting point (°C.) |
|---|---|---|---|---|
| B.1 | phenyl | $CH_3$ | phenyl | 193 |
| B.2 | phenyl | phenyl | phenyl | 208 |

The preparation of the hydrazones for use according to the present invention proceeds according to a general synthesis route by:

(I) the cyclocondensation of diene compounds with reaction products of arylamines and aldehydes in acid medium, (II) the formylation of the obtained julolidine type compound, and (III) the condensation with N,N-disubstituted hydrazines.

The first reaction step is described in the following literature:

P. A. Grieco, A. Bahsas, Tetrahedron Letters 29, 5855-8 (1988),

K. D. Hess, Liebigs Ann. Chem. 741, 117-123 (1970),

E. Borrione, M. Prato, G. Scorrano, M. Stivanello, V. Lucchini, J. Heterocyclic Chem. 25, 1831-5 (1988), E. F. Elslager, D. F. Worth, J. Heterocyclic Chem. 6, 597-8 (1969), D. F. Worth, S. C. Perricone, E. F. Elslager, J. Heterocyclic Chem. 7, 1353-6 (1970), V. Lucchini, M. Prato, G. Scorrano, P. Tecilla, J. Org. Chem. 53, 2251-8 (1988).

For illustrative purposes the preparation of hydrazone compound 1 of Table A is given below.

Preparation of Intermediate Compound P

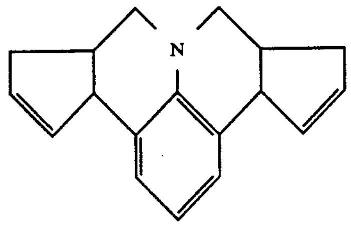

46.5 g (0.5 mole) of aniline were added to 500 ml of ethanol and the resulting mixture cooled down to 0° C. Hereto a solution of 32.5 ml (0.5 mole) of methanesulfonic acid dissolved in 32.5 ml of ethanol was added gradually to keep the temperature below 20° C. After cooling the suspension down to 10° C., 99 ml (1.2 mole) of cyclopentadiene were added.

On further cooling to 5° C. 87 ml (1.2 mole) of a 37% wt aqueous formaldehyde solution were added taking care not to exceed a reaction temperature of 10° C. A clear orange coloured solution was formed which was stirred for one hour and then poured into water to which 10N sodium hydroxide was added to neutralize the reaction mixture. A yellow precipitate was obtained which was separated by filtering and washed by stirring in ethanol.

Yield: 87 g (70%); Melting point: 98° C.

Preparation of Intermediate Compound Q

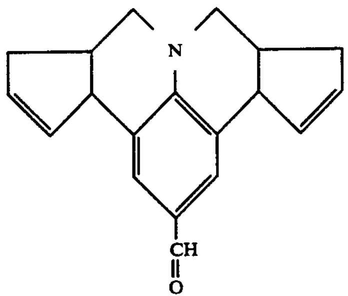

149.4 g (0.6 mole) of compound P were added to 450 ml of dimethylformamide and heated to 30° C. Over a period of about 90 minutes 65 ml of phosphorus oxychloride were added dropwise keeping the reaction temperature below 40° C. The reaction mixture was stirred overnight and then poured into ice-water. A sufficient amount of aqueous 5N sodium hydroxide was added to reach a pH of 8-9. Stirring was continued for 2 h.

The resulting precipitate was filtered off and washed by stirring twice in ethanol. Yield: 150 g (91%). Melting point: 81°-83° C.

Preparation of Compound A.1 of Table A

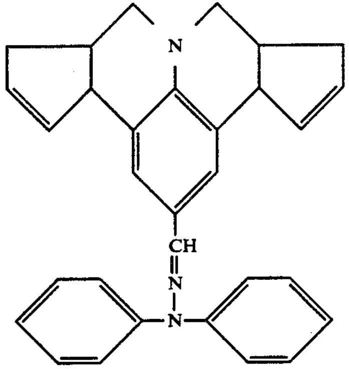

82.5 g (0.3 mole) of compound Q and 40.8 g of $CH_3COONa.3H_2O$ were introduced into 400 ml of methoxyisopropanol and then 69.5 g (0.315 mole) of 1,1-diphenylhydrazine hydrochloride were added. The suspension obtained was stirred for 2 h at room temperature, after which 100 ml of ethanol were added. The precipitate was filtered off and stirred in water. The product obtained was purified by column chromatography;

Yield 107 g (80%). Melting point 162° C.

For the production of a preferred recording material according to the present invention at least one of the hydrazone compounds according to one of the general formulae (I) to (V) is applied in combination with a resin binder to form a charge transporting layer adhering directly to a charge generating layer on an electrically conductive support. Through the resin binder the charge transporting layer obtains sufficient mechanical strength and obtains or retains sufficient capacity to hold an electrostatic charge for copying purposes. Preferably the specific resistivity of the charge transporting layer is not lower than $10^9$ ohm.cm. The resin binders are selected with the aim of obtaining optimal mechanical strength, adherence to the charge generating layer and favourable electrical properties.

Suitable electronically inactive binder resins for use in the charge transporting layer are e.g. cellulose esters, acrylate and methacrylate resins, e.g. cyanoacrylate resin, polyvinyl chloride, copolymers of vinyl chloride, e.g. copolyvinyl/acetate and copolyvinyl/maleic anhydride, polyester resins, e.g. copolyesters of isophthalic acid and terephthalic acid with glycol, aromatic polycarbonate resins and polyester carbonate resins.

A polyester resin particularly suited for use in combination with aromatic polycarbonate binders is DYNAPOL L 206 (registered trade mark of Dynamit Nobel for a copolyester of terephthalic acid and isophthalic acid with ethylene glycol and neopentyl glycol, the molar ratio of tere- to isophthalic acid being 3/2). Said polyester resin improves the adherence to aluminium that may form a conductive coating on the support of the recording material.

Suitable aromatic polycarbonates can be prepared by methods such as those described by D. Freitag, U. Grigo, P. R. Müller and W. Nouvertné in the Encyclopedia of Polymer Science and Engineering, 2nd ed., Vol. II, pages 648-718, (1988) published by Wiley and Sons Inc., and have one or more repeating units within the scope of the following general formula (VI):

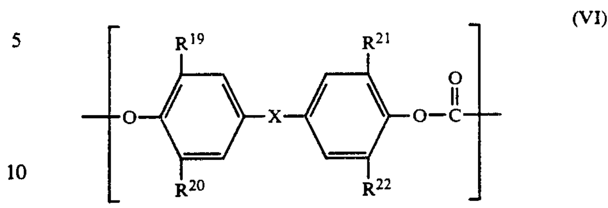

wherein: X represents S,

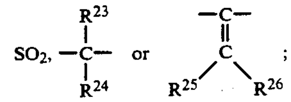

$R^{19}$, $R^{20}$, $R^{21}$, $R^{22}$, $R^{25}$ and $R^{26}$ each represents (same or different) hydrogen, halogen, an alkyl group or an aryl group, and $R^{23}$ and $R^{24}$ each represent (same or different) hydrogen, an alkyl group, an aryl group or together represent the necessary atoms to close a cycloaliphatic ring, e.g. cyclohexane ring.

Aromatic polycarbonates having a molecular weight in the range of 10,000 to 200,000 are preferred. Suitable polycarbonates having such a high molecular weight are sold under the registered trade mark MAKROLON of Farbenfabriken Bayer AG, W-Germany.

MAKROLON CD 2000 (registered trade mark) is a bisphenol A polycarbonate with molecular weight in the range of 12,000 to 25,000 wherein $R^{19}=R^{20}=R^{21}=R^{22}=H$, X is

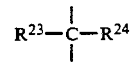

with $R^{23}=R^{24}=CH_3$.

MAKROLON 5700 (registered trade mark) is a bisphenol A polycarbonate with molecular weight in the range of 50,000 to 120,000 wherein $R^{19}=R^{20}=R^{21}=R^{22}=H$, X is $R^{23}$—C—$R^{24}$ with $R^{23}=R^{24}=CH_3$.

Bisphenol Z polycarbonate is an aromatic polycarbonate containing recurring units wherein $R^{19}=R^{20}=R^{21}=R^{22}=H$, X is

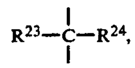

and $R^{23}$ together with $R^{24}$ represents the necessary atoms to close a cyclohexane ring.

Further useful binder resins are silicone resins, polystyrene and copolymers of styrene and maleic anhydride and copolymers of butadiene and styrene.

An example of an electronically active resin binder is poly-N-vinylcarbazole or copolymers of N-vinylcarbazole having a N-vinylcarbazole content of at least 40% by weight.

The ratio wherein the charge-transporting hydrazone compound and the resin binder are mixed can vary.

However, relatively specific limits are imposed, e.g. to avoid crystallization. The content of the hydrazone compound used according to the present invention in a positive charge transport layer is preferably in the range of 30 to 70% by weight with respect to the total weight of said layer. The thickness of the charge transport layer is in the range of 5 to 50 μm, preferably in the range of 5 to 30 μm.

The presence of one or more spectral sensitizing agents can have an advantageous effect on the charge transport. In that connection reference is made to the methine dyes and xanthane dyes described in U.S. Pat. No. 3,832,171. Preferably these dyes are used in an amount not substantially reducing the transparency in the visible light region (420–750 nm) of the charge transporting layer so that the charge generating layer still can receive a substantial amount of the exposure light when exposed through the charge transporting layer.

The charge transporting layer may contain compounds substituted with electron-acceptor groups forming an intermolecular charge transfer complex, i.e. donor-acceptor complex wherein the hydrazone compound represents an electron donating compound. Useful compounds having electron-accepting groups are nitrocellulose and aromatic nitro-compounds such as nitrated fluorenone-9 derivatives, nitrated 9-dicyanomethylenefluorenone derivatives, nitrated naphthalenes and nitrated naphthalic acid anhydrides or imide derivatives. The optimum concentration range of said derivatives is such that the molar donor/acceptor ratio is 10:1 to 1,000:1 and vice versa.

Compounds acting as stabilising agents against deterioration by ultra-violet radiation, so-called UV-stabilizers, may also be incorporated in said charge transport layer. Examples of UV-stabilizers are benztriazoles.

For controlling the viscosity of the coating compositions and controlling their optical clarity silicone oils may be added to the charge transport layer.

The charge transport layer used in the recording material according to the present invention possesses the property of offering a high charge transport capacity coupled with a low dark discharge. While with the common single layer photoconductive systems an increase in photosensitivity is coupled with an increase in the dark current and fatigue such is not the case in the present double layer arrangement wherein the functions of charge generation and charge transport are separated and a photosensitive charge generating layer is arranged in contiguous relationship to a charge transporting layer.

As charge generating compounds for use in a recording material according to the present invention any of the organic pigment dyes belonging to one of the classes a) to n) mentioned hereinbefore may be used. Further examples of pigment dyes useful for photogenerating positive charge carriers are disclosed in U.S. Pat. No. 4,365,014.

Inorganic substances suited for photogenerating positive charges in a recording material according to the present invention are e.g. amorphous selenium and selenium alloys e.g. selenium-tellurium, selenium-tellurium-arsenic and selenium-arsenic and inorganic photoconductive crystalline compounds such as cadmium sulphoselenide, cadmiumselenide, cadmium sulphide and mixtures thereof as disclosed in U.S. Pat. No. 4,140,529.

Said photoconductive substances functioning as charge generating compounds may be applied to a support with or without a binding agent. For example, they are coated by vacuum-deposition without binder as described e.g. in U.S. Pat. Nos. 3,972,717 and 3,973,959. When dissolvable in an organic solvent the photoconductive substances may likewise be coated using a wet coating technique known in the art whereupon the solvent is evaporated to form a solid layer. When used in combination with a binding agent or agents at least the binding agent(s) should be soluble in the coating solution and the charge generating compound dissolved or dispersed therein. The binding agent(s) may be the same as the one(s) used in the charge transport layer which normally provides best adhering contact. In some cases it may be advantageous to use in one or both of said layers a plasticizing agent, e.g. halogenated paraffin, polybiphenyl chloride, dimethylnaphthalene or dibutyl phthalate.

The thickness of the charge generating layer is preferably not more than 10 μm, more preferably not more than 5 μm.

In the recording materials of the present invention an adhesive layer or barrier layer may be present between the charge generating layer and the support or the charge transport layer and the support. Useful for that purpose are e.g. a polyamide layer, nitrocellulose layer, hydrolysed silane layer, or aluminium oxide layer acting as blocking layer preventing positive or negative charge injection from the support side. The thickness of said barrier layer is preferably not more than 1 micron.

The conductive support may be made of any suitable conductive material. Typical conductors include aluminum, steel, brass and paper and resin materials incorporating or coated with conductivity enhancing substances, e.g. vacuum-deposited metal, dispersed carbon black, graphite and conductive monomeric salts or a conductive polymer, e.g. a polymer containing quaternized nitrogen atoms as in Calgon Conductive polymer 261 (trade mark of Calgon Corporation, Inc., Pittsburgh, Pa., U.S.A.) described in U.S. Pat. No. 3,832,171.

The support may be in the form of a foil, web or be part of a drum.

An electrophotographic recording process according to the present invention comprises the steps of:

(1) overall negatively electrostatically charging, e.g. with corona-device, the photoconductive layer containing at least one of the above defined hydrazone compounds according to a general formula (I) to (V), (2) image-wise photo-exposing said layer thereby obtaining a latent electrostatic image, that may be toner-developed.

When applying a bilayer-system electrophotographic recording material including on an electrically conductive support a photosensitive charge generating layer in contiguous relationship with a charge transporting layer that contains one or more hydrazone compounds corresponding to a general formula (I) to (V) as defined above, the photo-exposure of the charge generating layer proceeds preferably through the charge transporting layer but may be direct if the charge generating layer is uppermost or may proceed likewise through the conductive support if the latter is transparent enough to the exposure light.

The development of the latent electrostatic image commonly occurs preferably with finely divided electrostatically attractable material, called toner particles that are attracted by coulomb force to the electrostatic charge pattern. The toner development is a dry or liquid toner development known to those skilled in the art.

In positive-positive development toner particles deposit on those areas of the charge carrying surface which are in positive-positive relation to the original image. In reversal development, toner particles migrate and deposit on the recording surface areas which are in negative-positive image value relation to the original. In the latter case the areas discharged by photo-exposure obtain by induction through a properly biased developing electrode a charge of opposite charge sign with respect to the charge sign of the toner particles so that the toner becomes deposited in the photo-exposed areas that were discharged in the imagewise exposure (ref.: R. M. Schaffert "Electrophotography"—The Focal Press—London, New York, enlarged and revised edition 1975, p. 50–51 and T. P. Maclean "Electronic Imaging" Academic Press—London, 1979, p. 231).

According to a particular embodiment electrostatic charging, e.g. by corona, and the imagewise photo-exposure proceed simultaneously.

Residual charge after toner development may be dissipated before starting a next copying cycle by overall exposure and/or alternating current corona treatment.

Recording materials according to the present invention depending on the spectral sensitivity of the charge generating layer may be used in combination with all kinds of photon-radiation, e.g. light of the visible spectrum, infra-red light, near ultra-violet light and likewise X-rays when electron-positive hole pairs can be formed by said radiation in the charge generating layer. Thus, they can be used in combination with incandescent lamps, fluorescent lamps, laser light sources or light emitting diodes by proper choice of the spectral sensitivity of the charge generating substance or mixtures thereof.

The toner image obtained may be fixed onto the recording material or may be transferred to a receptor material to form thereon after fixing the final visible image.

A recording material according to the present invention showing a particularly low fatigue effect can be used in recording apparatus operating with rapidly following copying cycles including the sequential steps of overall charging, imagewise exposing, toner development and toner transfer to a receptor element.

The following examples further illustrate the present invention. All parts, ratios and percentages are by weight unless otherwise stated.

The evaluations of electrophotographic properties determined on the recording materials of the following examples relate to the performance of the recording materials in an electrophotographic process with a reusable photoreceptor. The measurements of the performance characteristics were carried out as follows:

Two procedures were used for evaluating the discharge as a function of exposure: a routine sensitometric measurement in which the discharge was obtained for 8 different exposures including zero exposure and a more refined measurement in which the discharge was obtained for 360 different exposures in a single drum rotation.

In the routine sensitometric measurement the photoconductive recording sheet material was mounted with its conductive backing on an aluminium drum which was earthed and rotated at a circumferential speed of 5 cm/s. The recording material was sequentially charged with a negative corona at a voltage of −4.3 kV operating with a corona current of about 1 μA per cm of corona wire. Subsequently the recording material was exposed (simulating image-wise exposure) with a light dose of monochromatic light obtained from a monochromator positioned at the circumference of the drum at an angle of 45° with respect to the corona source. The photo-exposure lasted 400 ms. Thereupon, the exposed recording material passed an electrometer probe positioned at an angle of 180° with respect to the corona source. After effecting an overall post-exposure with a halogen lamp producing 54.000 mJ/m2 positioned at an angle of 270° with respect to the corona source a new copying cycle started. Each measurement relates to 40 copying cycles in which the photoconductor is exposed to the full light source intensity for the first 5 cycles, then sequentially to the light source the light output of which is moderated by grey filters of optical densities 0.5, 1.0, 1.5, 2.0 and 3.0 each for 5 cycles and finally to zero light intensity for the last 5 cycles.

The electro-optical results quoted in the EXAMPLES 1 to 20 and COMPARATIVE EXAMPLES hereinafter refer to charging level at zero light intensity (CL) and to discharge at a light intensity corresponding to the light source intensity moderated by a grey filter with an optical density of 1.0 to a residual potential RP. The % discharge is:

$$\frac{(CL - RP)}{CL} \times 100$$

For a given corona voltage, corona current, separating distance of the corona wires to recording surface and drum circumferential speed the charging level CL is only dependent upon the thickness of the charge transport layer and its specific resistivity. In practice CL expressed in volts should be preferably ≧30 d, where d is the thickness in μm of the charge transport layer.

In the refined sensitometric measurement the photoconductive recording sheet material is mounted on an aluminium drum as described above. The drum was rotated at a circumferential speed of 2 cm/s and the recording material sequentially charged with a negative corona at a voltage of −4.3 kV operating with a corona current of ca 0.5 μA per cm of corona wire, exposed (simulating image-wise exposure) with monochromatic light obtained from a monochromator positioned at the circumference of the drum at an angle of 40° with respect to the corona source for 500 ms, the voltage measured with an electrometer probe positioned at an angle of 90° with respect to the corona source and finally post-exposed with a halogen lamp producing 2,000 mJ/m2 positioned at an angle of 300° with respect to the corona source before starting a new copying cycle. Each measurement consisted of a single copying cycle in which a density disc with continuously varying optical density from an optical density of 0 to an optical density of 2.1 over a sector of 210° was rotated in front of the monochromator synchronously with the rotation of the drum with the surface potential being measured every degree of rotation. This gives the discharges for 360 predetermined exposures and hence a complete sensitometric curve, whereas the routine measurement only gives 8 points on that curve.

Differential scanning calorimetry was used both to determine the glass transition temperature of the charge transport layers and to investigate the solubility of the charge transport substances in the polycarbonate binding resin used. In the event of incomplete solubility of the charge transport substance in the binding resin a melt peak is observed in the scan, which corresponds to the melting point of the charge transport substance. The latent heat of melting/g of this peak is a measure of the insolubility of the charge transport substance.

The half-wave oxidation potential measurements were carried out using a polarograph with rotating (500 rpm) disc platinum electrode and standard saturated calomel electrode at room temperature (20° C. using a product concentration of $10^{-4}$ mole and an electrolyte (tetrabutylammonium perchlorate) concentration of 0.1 mole in spectroscopic grade acetonitrile. Ferrocene was used as a reference substance having a half-wave oxidation potential of +0.430 V.

All ratios and percentages mentioned in the Examples are by weight.

EXAMPLES 1 TO 10 AND COMPARATIVE EXAMPLE 1

A photoconductor sheet was produced by first doctor blade coating a 100 μm thick polyester film precoated with a vacuum-deposited conductive layer of aluminium with a 1% solution of γ-aminopropyltriethoxy silane in aqueous methanol. After solvent evaporation and curing at 100° C. for 30 minutes, the thus obtained adhesion/blocking layer was doctor blade coated with a dispersion of charge generating pigment to thickness of 0.6 micron.

Said dispersion was prepared by mixing 5 g of 4,10-dibromo-anthanthrone, 0.75 g of aromatic polycarbonate MAKROLON CD 2000 (registered trade mark) and 29.58 g of dichloromethane for 40 hours in a ball mill. Subsequently a solution of 4.25 g of MAKROLON CD 2000 (registered trade mark) in 40.75 g of dichloromethane was added to the dispersion to produce the composition and viscosity for coating.

After drying for 15 minutes at 50° C., this layer was coated with a filtered solution of charge transporting material and MAKROLON 5700 (registered trade mark) in dichloromethane at a solids content of 12% by wt.

This layer was then dried at 50° C. for 16 hours.

The characteristics of the thus obtained photoconductive recording material were determined with a light dose of 12 mJ/m2 of 540 nm light as described above.

The charge transport compounds used, their concentration in the charge transport layer of the different photoconductive recording materials, the electro-optical characteristics of the corresponding photoconductors and some differential scanning calorimetry results and glass transition temperatures (Tg) obtained with the charge transport layers are summarized in Table 1 for EXAMPLES 1 to 10 and COMPARATIVE EXAMPLE 1.

The charging levels for the photoconductive recording materials of EXAMPLES 1 to 10 are in general substantially higher than that for the photoconductive recording material of COMPARATIVE EXAMPLE 1, and the % discharges are also higher.

TABLE 1

| Example No. | Charge transport compound | Charge transport compound conc. in wt % | CL [V] | RP [V] | % Discharge | Charge transport layer characteristics Tg [°C.] | Melt peak [°C.] | Heat of melting [J/g] |
|---|---|---|---|---|---|---|---|---|
| 1 | A.1 | 50 | −441 | −99 | 77.6 | 97.0 | none | — |
| 2 | A.2 | 50 | −330 | −177 | 46.4 | | | |
| 3 | A.3 | 50 | −341 | −122 | 64.2 | 91.7 | none | — |
| 4 | A.4 | 50 | −859 | −671 | 21.8 | 84.8 | none | — |
| 5 | A.5 | 50 | −107 | −45 | 57.9 | 88.9 | none | — |
| 6 | A.6 | 50 | −465 | −192 | 58.7 | 113.8 | none | — |
| 7 | A.8 | 30 | −660 | −292 | 55.8 | 130.0 | 236.8 | 1.88 |
| 8 | A.9 | 50 | −503 | −155 | 69.2 | 104.3 | none | — |
| 9 | B.1 | 50 | −363 | −93 | 74.4 | 114.4 | none | — |
| 10 | B.2 | 30 | −678 | −378 | 44.2 | 131.0 | none | — |
| COMPARATIVE EXAMPLE 1 | X | 50 | −128 | −70 | 45.3 | 73.4 | 154.7 | 9.75 |

Compound X is disclosed in Japanese laid-open patent application 60-130,744 and has the following structural formula:

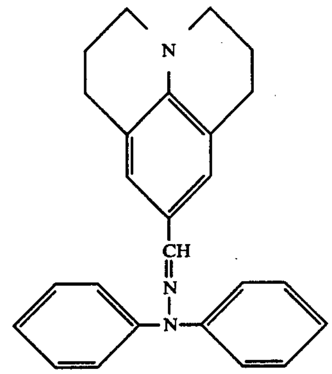

EXAMPLES 11 TO 20 AND COMPARATIVE EXAMPLE 2

EXAMPLES 11 to 20 were produced as for EXAMPLES 1 to 10 except that the adhesion/blocking layer is dispensed with, and the charge generating layer has a composition of 50% wt of metal-free purified X-phthalocyanine, 45% by wt of MAKROLON CD 2000 (registered trade mark) and 5% by wt of a polyester adhesion-promoting additive DYNAPOL L 206 (registered trade mark) instead of 50% wt of 4,10-dibromo-anthanthrone and 50% wt of MAKROLON CD 2000 (registered trade mark) and the charge generating layer dispersion was prepared by mixing for 20 minutes in a pearl mill.

The characteristics of the thus obtained photoconductive recording materials were determined with a light dose of 26.4 mJ/$m^2$ of 650 nm light as described above. The charge transport compounds used, their concentration in the charge transport layer of the different photoconductive recording materials and the electro-optical characteristics of the corresponding materials are summarized in Table 2.

TABLE 2

| Example No. | Charge trans-port com-pound | Charge transport compound conc. in wt % | CL [V] | RP [V] | % Discharge |
|---|---|---|---|---|---|
| 11 | A.1 | 50 | −752 | −237 | 68.5 |
| 12 | A.2 | 50 | −713 | −298 | 58.2 |
| 13 | A.3 | 50 | −685 | −265 | 61.3 |
| 14 | A.4 | 50 | −954 | −655 | 31.3 |
| 15 | A.5 | 50 | −613 | −240 | 60.8 |
| 16 | A.6 | 50 | −711 | −312 | 56.1 |
| 17 | A.8 | 30 | −696 | −336 | 51.7 |
| 18 | A.9 | 50 | −777 | −338 | 56.5 |
| 19 | B.1 | 50 | −659 | −267 | 59.5 |
| 20 | B.2 | 30 | −674 | −350 | 48.1 |
| COMPAR. EXAMPLE 2 | X | 50 | −723 | −300 | 58.5 |

EXAMPLE 21

In the production of the photosensitive recording material of EXAMPLE 21 a 100 μm thick polyester film precoated with a vacuum-deposited conductive layer of aluminium was first coated with a 1% solution of γ-aminopropyltriethoxy silane in aqueous methanol. After solvent evaporation and curing at 100° C. for 30 minutes, the thus obtained adhesion/blocking layer was doctor blade coated with a dispersion of charge generating pigment containing charge transport material to a thickness of 16 μm.

Said dispersion was prepared by mixing 2 g of 4,10-dibromoanthanthrone (DBA), 0.78 g of aromatic polycarbonate MAKROLON CD 2000 (registered trade mark) and 20.38 g of dichloromethane for 15 minutes in a pearl mill. Subsequently 0.8 g of charge transport compound A1, 4.42 g of MAKROLON CD 2000 (registered trade mark) and 11.61 g of dichloromethane were added to the dispersion and the dispersion mixed for a further 5 minutes to produce the composition and viscosity for coating.

The resulting layer was dried for 16 hours at 50° C.

Sensitometric characteristics of the thus obtained photosensitive recording material were determined as described above. The sensitivity to monochromatic 540 nm light exposure is expressed as the % discharge at an exposure ($I_{540}t$) of 38 mJ/m2 and the steepness of the discharge-exposure dependence is expressed as the % discharge observed between exposures ($I_{540}t$) of 12 mJ/m2 and 38 mJ/m2, corresponding to a difference in exposure of a factor 3.16. The results are given below:

% discharge for exposure of $I_{540}t$=38 mJ/m2: 92.8

% discharge between exposures ($I_{540}t$) of 12 and 38 mJ/m2: 62.6.

A refined sensitometric measurement was also carried out as described above. The exposures required for 10% and 90% discharge were found to differ by a factor of 2.2.

EXAMPLE 22

In the production of the photosensitive recording material of EXAMPLE 22 a 100 μm thick polyester film precoated with a vacuum-deposited conductive layer of aluminium was doctor-blade coated with a dispersion of charge generating pigment in admixture with charge generating substances.

Said dispersion was prepared by mixing for 15 minutes in a pearl mill 2.5 g of 4,10-dibromoanthanthrone, 5.85 g of an aromatic polycarbonate MAKROLON CD 2000 (registered trade mark), 0.65 g of a polyester adhesion promoting additive DYNAPOL L206 (registered trade mark) and 35.45 g of dichloromethane and subsequently adding 0.5 g of charge transport compound A1 and 0.5 g of 4-N,N-diethylamino-benzaldehyde 1′,1′-diphenylhydrazone with further mixing for 5 minutes.

The resulting layer was dried for 16 hours at 50° C.

The half-wave oxidation potentials versus a standard saturated calomel electrode of charge transport material A1 and 4-N,N-diethylamino-benzaldehyde 1,1-diphenylhydrazone were determined as described above and were 0.513 V and 0.538 V respectively, the difference being 0.025 V.

The sensitometric characteristics of the thus obtained photosensitive recording material were determined as described above. The sensitivity to monochromatic 540 nm light exposure is expressed as the % discharge at an exposure ($I_{540}t$) of 38 mJ/m2 and the steepness of the discharge-exposure dependence is expressed as the % discharge observed between exposures ($I_{540}t$) of 12 mJ/m2 and 38 mJ/m2, corresponding to a difference in exposure of a factor 3.16. The results are given below:

% discharge for exposure of $I_{540}t$=38 mJ/m2: 96.9

% discharge between exposures ($I_{540}t$) of 12 and 38 mJ/m2: 71.6.

A refined sensitometric measurement was also carried out as described above. The exposures required for 10% and 90% discharge were found to differ by a factor of 2.7.

EXAMPLE 23

The photosensitive recording material of EXAMPLE 23 was produced as described for Example 22 except that α,α′bis(6-ethoxy-1,2-dihydro-2,2,4-trimethyl-quinolin-1-yl)p-xylene was substituted for 4-N,N-diethylaminobenzaldehyde 1,1-diphenylhydrazone and the layer thickness was 13 μm instead of 11 μm.

The half-wave oxidation potential versus a standard saturated calomel electrode of charge transport compound A1 and α,α′bis(6-ethoxy-1,2-dihydro-2,2,4-trimethyl-quinolin-1-yl)p-xylene determined as described above were 0.513 V and 0.540, the difference being 0.027 V.

The sensitometric characteristics of the thus obtained photosensitive recording material were determined as described above. The sensitivity to monochromatic 540 nm light exposure is expressed as the % discharge at an exposure ($I_{540}t$) of 38 mJ/m2 and the steepness of the discharge-exposure dependence is expressed as the % discharge observed between exposures ($I_{540}t$) of 12 mJ/m2 and 38 mJ/m2, corresponding with a difference in exposure of a factor 3.16. The results are given below:

% discharge for exposure of $I_{540}t$=38 mJ/m2: 95.6

% discharge between exposures ($I_{540}t$) of 12 and 38 mJ/m2: 74.8.

A refined sensitometric measurement was also carried out as described above. The exposures required for 10% and 90% discharge were found to differ by a factor of 2.17.

EXAMPLE 24

The photosensitive recording material of EXAMPLE 24 was produced as described for Example 22 except that 2,5-bis(4-N,N-diethylaminophenyl)oxdiazole was substituted for 4-N,N-diethylaminobenzaldehyde 1′,1′-diphenylhydrazone and the layer thickness was 16 μm instead of 11 μm.

The half-wave oxidation potential versus a standard saturated calomel electrode of charge transport compound A1 and 2,5-bis(4-N,N-diethylaminophenyl)oxdiazole determined as described above were 0.513 V and 0.87, the difference being 0.357 V.

The sensitometric characteristics of the thus obtained photosensitive recording material were determined as described above. The sensitivity to monochromatic 540 nm light exposure is expressed as the % discharge at an exposure ($I_{540}t$) of 38 mJ/m2 and the steepness of the discharge-exposure dependence is expressed as the % discharge observed between exposures ($I_{540}t$) of 12 mJ/m2 and 38 mJ/m2, corresponding with a difference in exposure of a factor 3.16. The results are given below:

% discharge for exposure of $I_{540}t$=38 mJ/m2: 85.9

% discharge between exposures ($I_{540}t$) of 12 and 38 mJ/m2: 32.1.

A refined sensitometric measurement was also carried out as described above. The exposures required for 10% and 90% discharge were found to differ by a factor of 2.17.

We claim:

1. An electrophotographic recording material which comprises an electrically conductive support having thereon a photoconductive layer containing one or more p-type photoconductive charge transport substances, characterized in that at least one of the p-type charge transport substances is a hydrazone compound corresponding to a following general formula (I) to (V):

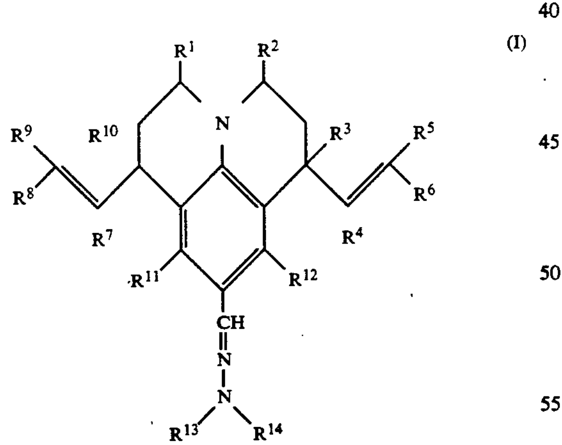

wherein:

each of $R^1$ and $R^2$ represents hydrogen, or $R^1$ represents hydrogen and $R^2$ represents an alkyl, an aryl or a heterocyclic group, each of $R^3$, $R^4$, $R^5$, $R^6$, $R^7$, $R^8$, $R^9$ and $R^{10}$ (same or different) represents hydrogen or an alkyl group, each of $R^{11}$ and $R^{12}$ (same or different) represents hydrogen, an alkyl group, an alkoxy group, thioalkoxy group, N-dialkyl group or halogen, each of $R^{13}$ and $R^{14}$ (same or different) represents an alkyl group, an aryl group or a heterocyclic group, or $R^{13}$ and $R^{14}$ together represent the necessary atoms to close a heterocyclic nitrogen containing ring;

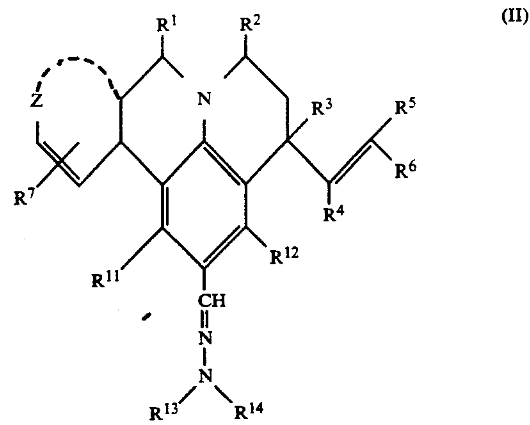

wherein:

each of $R^1$ and $R^2$ is hydrogen, or one of $R^1$ and $R^2$ represents hydrogen and the other represents an alkyl, an aryl or a heterocyclic group, Z represents the necessary atoms to close a 5- or 6-membered homocyclic ring, each of $R^3$, $R^4$, $R^5$, $R^6$ and $R^7$ (same or different) represents hydrogen or an alkyl group, each of $R^{11}$ and $R^{12}$ (same or different) represents hydrogen, an alkyl group, an alkoxy group, thioalkoxy group, N-dialkyl group or halogen, and each of $R^{13}$ and $R^{14}$ (same or different) represents an alkyl group, an aryl group or a heterocyclic group, or $R^{13}$ and $R^{14}$ together represent the necessary atoms to close a heterocyclic nitrogen containing ring;

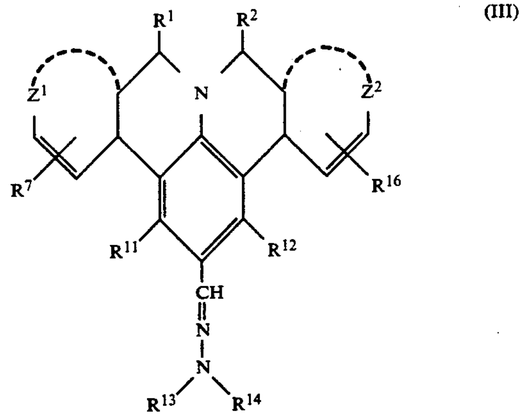

wherein:

each of $R^1$ and $R^2$ represents hydrogen, or $R^1$ represents hydrogen and $R^2$ represents an alkyl, an aryl or a heterocyclic group, each of $Z^1$ and $Z^2$ (same or different) represents the necessary atoms to close a 5- or 6-membered homocyclic ring, each of $R^7$ and $R^{16}$ (same or different) represents hydrogen or an alkyl group, each of $R^{11}$ and $R^{12}$ (same or different) represents hydrogen, an alkyl group, an alkoxy group, thioalkoxy group, N-dialkyl group or halogen, and each of $R^{13}$ and $R^{14}$ (same or different) represents an alkyl group, an aryl group or a heterocyclic group, or $R^{13}$ and $R^{14}$ together represent the necessary atoms to close a heterocyclic nitrogen containing ring;

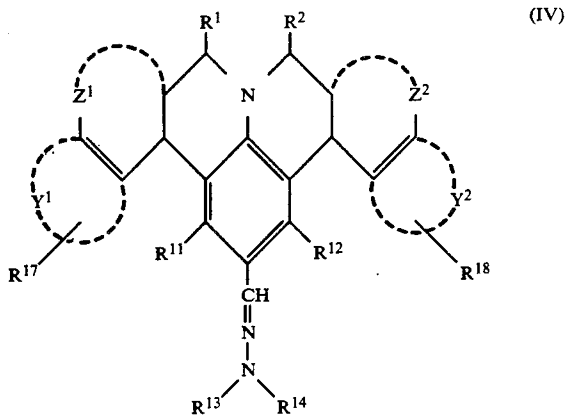

wherein:

each of $R^1$ and $R^2$ represents hydrogen, or $R^1$ represents hydrogen and $R^2$ represents an alkyl, an aryl or a heterocyclic group, each of $Z^1$ and $Z^2$ (same or different) represents the necessary atoms to close a 5- or 6-membered homocyclic ring, each of $Y^1$ and $Y^2$ (same or different) represents the necessary atoms to close a 6-membered aromatic ring, each of $R^{11}$ and $R^{12}$ (same or different) represents hydrogen, an alkyl group, an alkoxy group, thioalkoxy group, N-dialkyl group or halogen, each of $R^{13}$ and $R^{14}$ (same or different) represents an alkyl group, an aryl group or a heterocyclic group, or $R^{13}$ and $R^{14}$ together represent the necessary atoms to close a heterocyclic nitrogen containing ring, and each of $R^{17}$ and $R^{18}$ (same or different) represents hydrogen, an alkyl group, an alkoxy group or halogen;

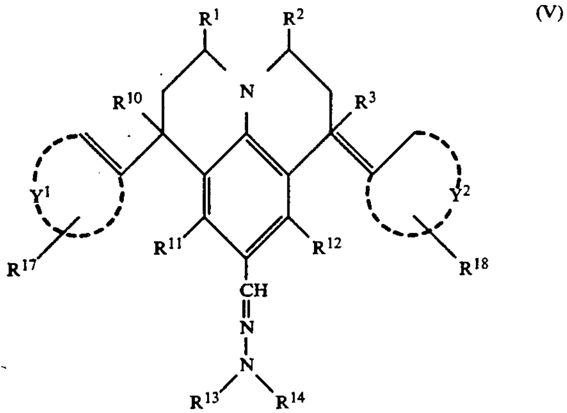

wherein:

each of $R^1$ and $R^2$ represents hydrogen, or $R^1$ represents hydrogen and $R^2$ represents an alkyl, an aryl or a heterocyclic group, each of $Y^1$ and $Y^2$ (same or different) represents the necessary atoms to close a 6-membered aromatic ring, each of $R^3$ and $R^{10}$ (same or different) represents hydrogen or alkyl, each of $R^{11}$ and $R^{12}$ (same or different) represents hydrogen, an alkyl group, an alkoxy group, thioalkoxy group, N-dialkyl group or halogen, each of $R^{13}$ and $R^{14}$ (same or different) represents an alkyl group, an aryl group or a heterocyclic group, or $R^{13}$ and $R^{14}$ together represent the necessary atoms to close a heterocyclic nitrogen containing ring, and each of $R^{17}$ and $R^{18}$ (same or different) represents hydrogen, an alkyl group, an alkoxy group or halogen.

2. An electrophotographic recording material according to claim 1, wherein said electrophotographic recording material comprises on said electrically conductive support a photosensitive charge generating layer in contiguous relationship with a charge transporting layer containing one or more hydrazone compounds corresponding to a general formula (I) to (V) as defined in claim 1.

3. An electrophotographic recording material according to claim 2, wherein said hydrazone compound is applied in combination with a resin binder to form a charge transporting layer adhering directly to said positive charge generating layer with one of the two layers being itself carried by an electrically conductive support.

4. An electrophotographic recording material according to claim 3, wherein the content of said hydrazone compound in the positive charge transport layer is in the range of 30 to 70 by weight with respect to the total weight of said layer.

5. An electrophotographic recording material according to claim 2, wherein the charge generating layer contains for photo-induced electron-positive hole pair formation an organic substance selected from the group consisting of:

a) perylimides,
b) polynuclear quinones,
c) quinacridones,
d) naphthalene 1,4,5,8 tetracarboxylic acid derived pigments,
e) phthalocyanines and naphthalocyanines,
g) benzothioxanthene-derivatives,
h) perylene 3,4,9,10-tetracarboxylic acid derived pigments,
i) polyazo pigments, and
j) squarilium dyes,
k) polymethine dyes,
l) dyes containing quinazoline groups,
m) triarylmethane dyes, and
n) dyes containing 1,5-diamino-anthraquinone groups.

6. An electrophotographic recording material according to claim 1, wherein said electrophotographic recording material comprises on an electrically conductive support a negatively chargeable photoconductive recording layer which contains in an electrically insulating organic polymeric binder material at least one photoconductive n-type pigment substance and at least one p-type photoconductive charge transport substance, wherein (i) at least one of said p-type charge transport substances is a said hydrazone compound, (ii) the half wave oxidation potentials of in admixture applied p-type charge transport substances relative to a standard saturated calomel electrode do not differ by more than 0.400 V, (iii) said recording layer has a thickness in the range of 4 to 40 μm and comprises 8 to 80% by weight of said n-type pigment substance and 0.01 to 40% of said p-type charge transport substance(s) that is (are) molecularly distributed in said electrically insulating organic polymeric binder material that has a volume resistivity of at least $10^{14}$ Ohm-m, and wherein (iv) said recording layer in electrostatically charged state requires for 10% and 90% discharge respectively exposures to conductivity increasing electromagnetic radiation that differ by a factor 4.5 or less.

7. An electrophotographic recording material according to claim 6, wherein the resin binder is selected from the group consisting of a cellulose ester, acrylate or methacrylate resin, polyvinyl chloride, copolymer of vinyl chloride, polyester resin, an aromatic polycarbonate resin, an aromatic polyester carbonate resin, silicone resin, polystyrene, a copolymer of styrene and maleic anhydride, a copolymer of butadiene and styrene, poly-N-vinylcarbazole and a copolymer of N-vinylcarbazole having a N-vinylcarbazole content of at least 40% by weight.

8. An electrophotographic recording material according to claim 1, wherein said recording layer has a thickness in the range of 5 to 35 μm and contains 10 to 70% by weight of said n-type pigment substance and 1 to 30% by weight of said hydrazone compound.

9. An electrophotographic recording material according to claim 1, wherein the n-type pigment(s) is (are) from at least one of the following classes:

- perylimides,
- polynuclear quinones,
- quinacridones,
- naphthalene 1,4,5,8-tetracarboxylic acid derived pigments including the perinones,
- n-type indigo and thioindigo dyes,
- perylene 3,4,9,10-tetracarboxylic acid derived pigments including condensation products with o-diamines, and
- n-type polyazo-pigments including bisazo-, trisazo- and tetrakisazo-pigments.

10. An electrophotographic recording material according to claim 1, wherein the hydrazone compound corresponds to the following general formula:

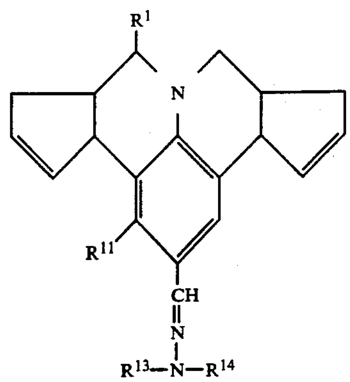

wherein:

$R^1$ represents hydrogen or phenyl,
$R^{11}$ represents hydrogen or methyl,
$R^{13}$ represents methyl, benzyl, phenyl or 1-naphthyl, and
$R^{14}$ represents phenyl or 2-pyridyl, or
$R^{13}$ and $R^{14}$ together represent the necessary atoms to close with nitrogen a 2-methyl-indolinyl nucleus.

11. An electrophotographic recording material according to claim 1, wherein the hydrazone compound corresponds to the following general formula:

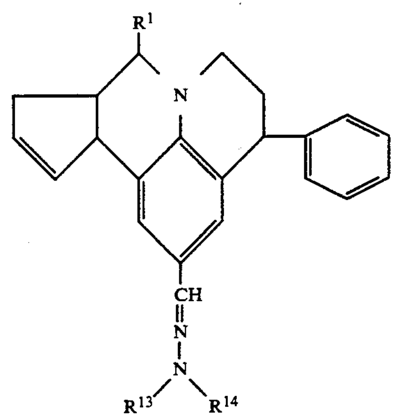

wherein:

$R^1$ represents phenyl,
$R^{13}$ represents methyl or phenyl, and
$R^{14}$ represents phenyl, or
$R^{13}$ and $R^{14}$ together represent the necessary atoms to close with nitrogen a 2-methyl-indolinyl nucleus.

12. An electrophotographic recording material according to claim 1, wherein the conductive support is made of aluminium, steel, brass or paper or resin material incorporating or being coated with a conductivity enhancing substance, the support being in the form of a foil, web or being part of a drum.

13. An electrophotographic recording material according to claim 1, wherein said hydrazone compound has a melting point of at least 100° C.

* * * * *